United States Patent [19]

Vaughn, Jr.

[11] 4,309,319
[45] Jan. 5, 1982

[54] SILICONE RESIN COATING COMPOSITION

[75] Inventor: Howard A. Vaughn, Jr., Schenectady, N.Y.

[73] Assignee: General Electric Company, Waterford, N.Y.

[21] Appl. No.: 82,163

[22] Filed: Oct. 5, 1979

Related U.S. Application Data

[63] Continuation-in-part of Ser. No. 964,910, Nov. 30, 1978.

[51] Int. Cl.³ .......................... C08L 1/28; C08L 5/00; C08L 83/00
[52] U.S. Cl. ..................................... 260/9; 106/193 J; 106/209; 260/13
[58] Field of Search ...................... 260/9, 13, 29.2 M; 106/287.12, 287.16, 287.24, 287.36, 197 R, 209, 193 J; 428/447

[56] References Cited

U.S. PATENT DOCUMENTS

| | | | |
|---|---|---|---|
| 3,652,539 | 3/1972 | Miura et al. | 106/197 R |
| 3,708,225 | 1/1973 | Misch et al. | 428/447 |
| 3,868,343 | 2/1975 | Stengle et al. | 260/29.2 M |
| 3,898,090 | 8/1975 | Clark | 260/29.2 M |
| 3,976,497 | 8/1976 | Clark | 428/447 |
| 3,986,997 | 10/1976 | Clark | 260/29.2 M |
| 4,027,073 | 5/1977 | Clark | 260/29.2 M |
| 4,159,206 | 6/1979 | Armbruster et al. | 260/29.2 M |

FOREIGN PATENT DOCUMENTS 765890  9/1971  Belgium .............................. 428/447

OTHER PUBLICATIONS

Lange, "Handbook of Chemistry," Ninth Edition, 1956, p. 1725.

*Primary Examiner*—Allan Lieberman
*Attorney, Agent, or Firm*—Hedman, Casella, Gibson & Costigan

[57] ABSTRACT

A silicone resin coating composition which, when applied to a solid substrate, provides a thick abrasion resistant coating thereto, is disclosed herein. The coating composition has a basic pH in the range of from 7.1–7.8 and is prepared by hydrolyzing an alkyltrialkoxysilane or aryltrialkoxysilane in an aqueous colloidal silica dispersion. A thickening agent is added to the resultant hydrolysis product.

16 Claims, No Drawings

SILICONE RESIN COATING COMPOSITION

CROSS-REFERENCE TO RELATED APPLICATION

This application is a continuation-in-part of copending U.S. application Ser. No. 964,910, filed Nov. 30, 1978.

BACKGROUND OF THE INVENTION

This invention relates to a protective coating composition. More particularly, it relates to a silicon resin coating composition which, when applied to a substrate, forms a protective, abrasion-resistant coating thereon.

Recently, the substitution of glass glazing with transparent materials which do not shatter or are more resistant to shattering than glass, has become widespread. For example, transparent glazing made from synthetic organic polymers is now utilized in public transportation vehicles, such as trains, buses, taxis and airplanes. Lenses, such as for eye glasses and other optical instruments, as well as glazing for large buildings, also employ shatter-resistant transparent plastics. The lighter weight of these plastics in comparison to glass is a further advantage, especially in the transportation industry where the weight of the vehicle is a major factor in its fuel economy.

While transparent plastics provide the major advantage of being more resistant to shattering and lighter than glass, a serious drawback lies in the ease with which these plastics mar and scratch, due to everyday contact with abrasives, such as dust, cleaning equipment and/or ordinary weathering. Continuous scratching and marring results in impaired visibility and poor aesthetics, and oftentimes requires replacement of the glazing or lens or the like.

One of the most promising and widely used transparent plastics for glazing is polycarbonate, such as that known as Lexan ®, sold by General Electric Company. It is a tough material, having high impact strength, high heat deflection temperature, good dimensional stability, as well as being self-extinguishing, and is easily fabricated. Acrylics, such as polymethylmethacrylate, are also widely used transparent plastics for glazing.

Attempts have been made to improve the abrasion resistance of transparent plastics. For example, scratch-resistant coatings formed from mixtures of silica, such as colloidal silica or silica gel, and hydrolyzable silanes in a hydrolysis medium, such as alcohol and water, are known. U.S. Pat. Nos. 3,708,225, 3,986,997 and 3,976,497, for example, describe such compositions.

In copending U.S. application Ser. No. 964,910 coating compositions having improved resistance to moisture and humidity and ultraviolet light are disclosed. It was discovered therein that, in direct contrast to the teachings of U.S. Pat. No. 3,986,997, compositions having a basic pH, i.e., 7.1–7.8, do not immediately gel but in fact provide excellent excellent abrasion resistant coatings on solid substrates.

In recent months, it has become desirable to even further improve the abrasion resistance offered by the coating compositions of said copending U.S. application Ser. No. 964,910.

SUMMARY OF THE INVENTION

Accordingly, it is one object of the present invention to provide a novel protective coating resin for solid substrates.

Another object of this invention is to provide a coating resin for solid substrates which, when applied to the substrate, provides an improved abrasion-resistant surface thereto.

Still another object of the present invention is to provide a coating resin composition, especially well suited for providing an improved abrasion resistant surface to transparent substrates without impairing the optical clarity of the substrate.

A still further object of the present invention is to provide a coating resin composition which results in an improved abrasion-resistant surface when applied to metals and metallized surfaces.

These and other objects are accomplished herein by a coating composition comprising a dispersion of colloidal silica in an aliphatic alcohol-water solution of the partial condensate of a silanol of the formula $RSi(OH)_3$, wherein R is selected from the group consisting of alkyl having from 1 to 3 carbon atoms and aryl, at least 70 weight percent of the silanol being $CH_3Si(OH)_3$, said composition containing 10 to 50 weight percent solids, said solids consisting essentially of 10 to 70 weight percent colloidal silica and 30 to 90 weight percent of the partial condensate, said composition further containing a thickening agent and wherein said composition has a pH of from 7.1 to about 7.8.

DETAILED DESCRIPTION OF THE INVENTION

The coating compositions of this invention are prepared by hydrolyzing a trialkoxysilane or a mixture of trialkoxysilanes of the formula $R'Si(OR)hd 3$, wherein R' is alkyl of from 1 to 3 carbons or aryl, such as phenyl, and R is alkyl, in an aqueous dispersion of colloidal silica.

In the practice of the present invention, suitable aqueous colloidal silica dispersions generally have a particle size of from 5 to 150 millimicrons in diameter. These silica dispersions are well kown in the art and commercially available ones include, for example, those sold under the trademarks of Ludox (duPont) and Nalcoag (NALCO Chemical Co.). Such colloidal silicas are available as both acidic and basic hydrosols. For the purpose of this invention, wherein the pH of the coating compositions is on the basic side, basic colloidal silica sols are preferred. However, acidic colloidal silicas, wherein the pH is adjusted to a basic level, are also contemplated. In addition, it has been found that colloidal silicas having a low alkali content (e.g., $Na_2O$) yield a more stable coating composition. Thus, colloidal silicas having an alkali content of less than 0.35% (calculated as $Na_2O$) have been found to be preferable. Moreover, colloidal silicas having average particle size of from 10 to 30 millimicrons are also preferred. A particularly preferred aqueous colloidal silica dispersion for the purpose herein is known as Ludox LS, sold by duPont Company.

In accordance with this invention, the aqueous colloidal silica dispersion is added to a solution of a small amount of alkyltriacetoxylsilane in alkyltrialkoxysilane or aryltrialkoxysilane. For the purposes herein, from about 0.07 parts by weight, to about 0.1 parts by weight, based on 100 parts by weight of the total composition of the alkyltriacetoxysilane is used. The temperature of the reaction mixture is maintained at about 20° C. to about 40° C., preferably 20° C. to about 30° C., and most preferably below 25° C. It has been found that in about six to eight hours sufficient trialkoxysilane has hydrolyzed so as to reduce the initial two phase liquid mixture to one liquid phase in which the now treated silica (i.e., treated by its admixture with the alkyltrialkoxysilane or aryltrialkoxysilane) is dispersed. In general, the hydrolysis reaction is allowed to continue for a total of about 12 to 48 hours, depending upon the desired viscosity of the final product. The more time the hydrolysis reaction is permitted to continue, the higher will be the viscosity of the product. After the hydrolysis has been completed to the desired extent, the solids content is adjusted by the addition of alcohol, preferably isopropanol, to the reaction mixture. The use of isopropanol herein has been found to provide better optical clarity than if other alcohols, like isobutanol, are used. If, however, excellent optical clarity is not a prime concern, other alcohols which are suitable dilution solvents include lower aliphatic alcohols, such as methanol, ethanol, propanol, n-butyl alcohol and t-butyl alcohol. Mixtures of such alcohols can be used, too. The solvent system should contain from about 20 to 75 weight percent alcohol to ensure solubility of the partial condensate (siloxanol). Optionally, additional water-miscible polar solvents, such as acetone, butyl cellosolve and the like in minor amounts, like no more than 20 weight percent of the co-solvent system can also be used. The solids content of the coating composition of this invention is generally preferred to be in the range of from about 10 to 25%, more preferably, about 13 to about 20% by weight of the total composition.

In order to provide the improved abrasion resistance desired herein, a thickening agent is added to the resin composition. The thickening agent may be added either during hydrolysis or after dilution with alcohol as described hereinabove. The addition of the thickening agent results in a higher viscosity fluid resin which permits a thicker wet film to be deposited on the substrate which in turn results in a thicker cured film having increased abrasion resistance. Surprisingly, increasing the viscosity of the coating resins herein by the addition of a thickening agent does not result in a shortened shelf life of the composition as was found to occur when the viscosity was increased by simply raising the solids content of the composition.

Thickening agents suitable for the purposes herein include hydroxypropyl guar gum and hydroxypropyl cellulose. Amounts contemplated are about 0.1 to about 1%, preferably about 0.1 to about 0.5% by weight of the total composition.

The pH of the resultant coating compositions of the invention is in the range of from about 7.1 to about 7.8, preferably higher than 7.2, such as from 7.3 to about 7.5. If necessary, dilute base as ammonium hydroxide, or weak acid, such as acetic acid, can be added to the composition to adjust the final pH to this desired range. At these basic pH's, the compositions are translucent liquids which are stable at room temperature for at least several weeks. When stored at temperatures below about 5° C. (40° F.) the period of stability is increased even further.

The alkyltriacetoxysilane is used to buffer the basicity of the initial two liquid phase reaction mixtures and thereby also temper the hydrolysis rate. While the use of alkyltriacetoxysilane is preferred herein, glacial acetic acid may be used in its place, as well as other acids such as organic acids like propionic, butyric, citric, benzoic, formic, oxalic and the like. Alkyltriacetoxysilanes wherein the alkyl group contains from 1 to 6 carbon atoms can be used, alkyl groups having from 1 to 3 carbon atoms being preferred. Methyltriacetoxysilane is most preferred for the purposes herein.

The silanetriols, $RSi(OH)_3$, hereinbefore mentioned, are formed in situ as a result of the admixture of the corresponding trialkoxysilanes with the aqueous medium, i.e., the aqueous dispersion of colloidal silica. Exemplary trialkoxysilanes are those containing methoxy, ethoxy, isopropoxy and n-butoxy substituents which, upon hydrolysis, generate the silanetriol and further liberate the corresponding alcohol. In this way, at least, a portion of the alcohol content present in the final coating composition is provided. Of course, if a mixture of trialkoxysilanes is employed, as provided for hereinabove, a mixture of different silanetriols, as well as different alcohols, is generated. Upon the generation of the silanetriol or mixtures of silanetriols in the basic aqueous medium, condensation of the hydroxyl substituents to form

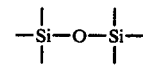

bonding occurs. This condensation takes place over a period of time and is not an exhaustive condensation but rather the siloxane retains an appreciable quantity of silicon-bonded hydroxyl groups which render the polymer soluble in the alcohol-water cosolvent. This soluble partial condensate can be characterized as a siloxanol polymer having at least one silicon-bonded hydroxyl group per every three

units.

The non-volatile solids portion of the coating composition herein is a mixture of colloidal silica and the partial condensate ( or siloxanol) of a silanol. The major portion or all of the partial condensate or siloxanol is obtained from the condensation of $CH_3Si(OH)_3$ and, depending upon the input of ingredients to the hydrolysis reaction, minor portions of partial condensate can be obtained, for example, from the condensation of $CH_3Si(OH)_3$ with $C_2H_5Si(OH)_3$ or $C_3H_7Si(OH)_3$; $CH_3Si(OH)_3$ with $C_6H_5Si(OH)_3$, or even mixtures of the foregoing. For optimum results in the cured coating it is preferred to use all methyltrimethoxysilane (thus generating all monomethylsilanetriol) in preparing the coating compositions herein. In the preferred coating compositions herein the partial condensate is present in an amount of from about 55 to 75 weight percent of the total solids in a cosolvent of alcohol and water, the alcohol comprising from about 50% to 95% by weight of the cosolvent.

At low solids content, such as about 13%, it has been found that the polysiloxane polyether copolymers disclosed in copending application Ser. No. 964,911, filed Nov. 30, 1978, incorporated herein by reference, may be employed in the thickened compositions of this invention as flow control additives which assist in the prevention of flowmarks, dirtmarks and the like on the surface of the substrate which is coated. Generally, these polysiloxane polyether copolymers may be employed in amounts of from about 2.5 to about 15% by weight of the total solids of the composition.

The coating compositions of this invention will cure on a substrate at temperatures of, for example, 120° C. without the aid of an added curing catalyst. However, in order to employ more desirable milder curing conditions, buffered latent condensation catalysts can be added. Included in this class of catalysts are alkali metal salts of carboxylic acids, such as sodium acetate, potassium formate and the like. Amine carboxylates, such as dimethylamine acetate, ethanolamine acetate, dimethylaniline formate and the like, quaternary ammonium carboxylates such as tetramethylammonium acetate, benzyltrimethylammonium acetate, metal carboxylates, like tin octoate and amines such as triethylamine, triethanolamine, pyridine and the like are also contemplated curing catalysts herein. Alkali hydroxides, like sodium hydroxide and ammonium hydroxide can also be used as curing catalysts herein. Moreover, typical commercially available colloidal silica, especially those having a basic pH, contain free alkali metal base and alkali metal carboxylate catalysts will be generated in situ during the hydrolysis reaction herein.

The amount of curing catalyst can be varied within a wide range, depending upon the desired curing conditions. However, in general, catalyst in the amounts of from about 0.05 to about 0.5 weight percent, preferably about 0.1 weight percent, of the composition can be used. Compositions containing catalysts in these amounts can be cured on a solid substrate in a relatively short time at temperatures in the range of from about 75°–150° C. to provide a transparent abrasion resistant surface coating.

The coating compositions of the present invention can be applied to a variety of solid substrates by conventional methods, such as flowing, spraying or dipping, to form a continuous surface film. Optimum coating thicknesses are obtained by slow dip coating procedures. Substrates which are especially contemplated herein are transparent, as well as non-transparent, plastics and metals. More particularly, these plastics are synthetic organic polymeric substrates such as acrylic polymers like poly(methylmethacrylate), polyesters, such as poly(ethylene terephthalate), poly(butylene terephthalate), etc., polyamides, polyimides, acrylonitrile-styrene copolymers, styrene-acrylonitrilebutadiene copolymers, polyvinyl chloride, butyrates, polyethylene and the like. The coating compositions of this invention are especially useful as coatings for polycarbonates, such as those polycarbonates known as Lexan ®, sold by General Electric Company and as coatings for injection molded or extruded acrylics, such as polymethylmethacrylates. Metal substrates on which the present protective coatings are also effective include bright and dull metals like aluminum and bright metallized surfaces like sputtered chromium alloy. Other solid substrates contemplated herein include wood, painted surfaces, leather, glass, ceramics and textiles.

By choice of the proper formulation, application conditions and pretreatment, including the use of primers, of the substrate, the coatings can be adhered to substantially all solid substrates. A hard coating having all of the aforementioned characteristics and advantages is obtained by the removal of the solvent and volatile materials. The coating composition will air-dry to a tack-free condition, but heating in the range of 75° C. to 200° C. is necessary to obtain condensation of residual silanols in the partial condensate. This final cure results in the formation of silsesquioxane ($RSiO_{3/2}$). In the finished cured coating the ratio of $RiSO_{3/2}$ units to $SiO_2$ will range from about 0.43 to about 9.0, preferably 1 to 3. A cured coating having a ratio of $RSiO_{3/2}$ to $SiO_2$, where R is methyl, of 2 is most preferred. Coating thicknesses may vary but for the improved abrasion resistance desired herein, coating thicknesses of 3–10 microns, preferably 5 microns, are utilized.

In order that those skilled in the art may better understand how to practice the present invention, the following examples are given by way of illustration and not by way of limitation.

EXAMPLES 1–5

80.1 lbs. of Ludox LS (aqueous colloidal silica dispersion, average particle size of 12 millimicrons, pH 8.2 sold by duPont) is added, over a period of one-half hour, to a solution of 135 g of methyltriacetoxysilane in 97.6 lbs. of methyltrimethoxysilane. The temperature of the reaction mixture is maintained between 20° C. and 30° C. The hydrolysis is allowed to proceed over a period of sixteen hours. At this time the reaction mixture is diluted with 182 lbs. of isopropanol.

Aliquots of 500 g. are taken from the resultant diluted reaction mixture resin and to each is added 1.5 g of a thickener. The thickeners are hydroxypropyl cellulose (Klucel, Types G, H, and J, sold by Hercules Inc.) and hydroxypropyl guar gum. The thickeners are added in small portions to the well-agitated resin samples. The viscosities of the resins are determined using a calibrated Cannon-Fenske routine type viscometer. The pH of all resins is determined using a Corning Model 10 pH meter fitted with a combination pH electrode. The viscosities and pH's are shown in Table 1.

TABLE 1

| Example | Thickener | Viscosity | pH |
|---|---|---|---|
| 1 (control) | — | 5.3 Centistokes | 7.4 |
| 2 | Klucel, Type G | 14.8 Centistokes | 7.35 |
| 3 | Klucel, Type H | 74.2 Centistokes | 7.5 |
| 4 | Klucel, Type J | 8.8 Centistokes | 7.5 |
| 5 | Hydroxypropyl guar gum | 20.2 Centistokes | 7.4 |

Plaques of Acrylite FF (extruded transparent acrylic sheet manufactured by Cyro Industries) are dip coated in these five resins at four inches per minute. A sixth acrylic plaque is dip coated in the resin of Example 3 at two inches per minute. All the plaques are allowed to air dry for one-half hour and are then cured at 85° C. for three hours. The thickness of the cured films is measured by masking the coated plaque with pressure sensitive adhesive tape that is resistant to hydrofluoric acid and the coating is etched away in an unmasked area using hydrofluoric acid. The plaque is rinsed with water. The masking tape is removed and the thickness of the film is measured using a Talysurf surface profile measuring device. The results are shown in Table 2.

TABLE 2

| | Acrylite FF | |
|---|---|---|
| Example | 4"/Min. | 2"/Min. |
| 1(control) | $50 \times 10^{-6}$ in. | — |
| 2 | $90 \times 10^{-6}$ in. | — |
| 3 | $260 \times 10^{-6}$ in. | $210 \times 10^{-6}$ 0 in. |

TABLE 2-continued

| | Acrylite FF | |
|---|---|---|
| Example | 4"/Min. | 2"/Min. |
| 4 | $60 \times 10^{-6}$ in. | — |
| 5 | $120 \times 10^{-6}$ in. | — |

EXAMPLE 6

Pieces of transparent Lexan ® poly(bisphenol-A-carbonate) are primed with a thermosetting acrylic emulsion (Rhoplex AC 658, sold by Rohm & Hass, a copolymer of n-butylmethacrylate and methylmethacrylate having hydroxy functionality crosslinked with a substituted melamine, diluted to 4% solids by using a mixture of 875 parts by weight distilled water, 470 parts by weight 2-butoxyethanol and 125 parts by weight Rhoplex AC 658) allowed to air dry and cured for one-half hour at 120° C. They are dip coated in the composition of Example 3 at two and four inches per minute, allowed to dry for one-half hour and cured one hour at 120° C. The cured coating thicknesses are measured in the same fashion as described above. The results appear in Table 3.

TABLE 3

| Primed Lexan ® Sheet Coated with the composition of Example 3 | |
|---|---|
| 4"/Min. | 2"/Min. |
| $280 \times 10^{-6}$ in. | $240 \times 10^{-6}$ in. |

Other primers may be used such as Rhoplex 1230, also a thermosetting acrylic emulsion sold by Rhom & Hass, or an ethanol-isobutanol solution containing 1.5 weight percent of gamma-aminopropyltriethoxysilane and 1.5 weight percent of a preformed reaction product of gamma-aminopropyltriethoxysilane and maleic anhydride.

EXAMPLE 7

Pieces of Acrylite FF are dip coated in the resin compositions of Examples 1, 2 and 3 above at a withdrawal rate of four inches per minute. They are allowed to dry and then cured 2 hours at 90° C. These plaques are abraded on a falling sand abraser using 250 ml. of 20-30 mesh silica sand. Percent haze is measured using a Gardner Hazemeter. The change in percent haze after abrasion is shown in Table 4.

TABLE 4

| Acrylite FF coated with the composition of Example | Δ% Haze |
|---|---|
| 1 | 17.2 |
| 2 | 10.5 |
| 3 | 5.5 |

An uncoated sheet of Acrylite FF abraded in the same way has a Δ% Haze of 39.0.

Obviously, other modifications and variations of the present invention are possible in the light of the above teachings. For example, additives and other modifying agents, such as pigments, dyes and the like, may be added to the compositions of this invention. It is to be understood, however, that changes may be made in the particular embodiments described above which are within the full intended scope of the invention as defined in the appended claims.

I claim:

1. An aqueous coating composition comprising a dispersion of colloidal silica having a particle size of from 5 to 150 millimicrons in diameter in a loweraliphatic alcohol-water solution of the partial condensate of a silanol of the formula $RSi(OH)_3$, wherein the lower-aliphatic alcohol-water solvent contains from about 20 to 75 weight percent of said lower-aliphatic alcohol component and wherein R is selected from the group consisting of alkyl having from 1 to 3 carbon atoms and aryl, at least 70 weight percent of the silanol being $CH_3Si(OH)_3$, said composition containing 10 to 50 weight percent solids consisting essentially of 10 to 70 weight percent colloidal silica and 30 to 90 weight percent of the partial condensate, the composition further containing from about 0.1 to about 1 percent by weight of a thickening agent selected from the group consisting of hydroxypropyl guar gum and hydroxypropyl cellulose, said composition having a pH of 7.1 to about 7.8.

2. A coating composition as defined in claim 1, wherein the aliphatic alcohol is a mixture of methanol and isopropanol.

3. A coating composition as defined in claim 1, wherein said partial condensate is of $CH_3Si(OH)_3$.

4. A coating composition as defined in claim 1 containing from about 0.05 to about 0.5 weight percent of a buffered latent silanol condensation catalyst.

5. A coating composition as defined in claim 4 wherein said catalyst is sodium acetate.

6. A coating composition as defined in claim 4 wherein said catalyst is tetramethylammonium acetate.

7. A coating composition as defined in claim 1 wherein the pH is 7.2 to about 7.8.

8. A coating composition as defined in claim 1 wherein the composition contains from about 10 to about 25 weight percent solids consisting essentially of 25-45 weight percent colloidal silica and 55-75 weight percent of the partial condensate.

9. A coating composition as defined in claim 8 wherein the partial condensate is of $CH_3Si(OH)_3$.

10. A coating composition as defined in claim 1 wherein the composition contains about 20% solids, the partial condensate is of $CH_3Si(OH)_3$, and the aliphatic alcohol is a mixture of methanol and isopropanol.

11. An aqueous coating composition prepared by admixing an aqueous colloidal silica dispersion having a particle size of from 5 to 150 millimicrons in diameter with a solution of an alkyltriacetoxysilane in an alkyltrialkoxysilane, maintaining the temperature of the admixture at from about 20° C. to about 30° C. for a sufficient time to reduce the reaction mixture to one liquid phase maintaining the pH of the composition in the range of from about 7.1 to about 7.8, adjusting the solids content of the reaction mixture by the addition of a lower-aliphatic alcohol thereto in an amount sufficient to provide from about 20 to 75 percent of said lower-aliphatic alcohol component and adding from about 0.1 to about 1 percent by weight of a thickening agent selected from the group consisting of hydroxypropyl guar gum and hydroxypropyl cellulose to the admixture.

12. An aqueous coating composition as defined in claim 11 wherein said alkyltrialkoxysilane is methyltrimethoxysilane, said alkyl(triacetoxy)silane is methyl(triacetoxy)silane and said aliphatic alcohol is isopropanol.

13. An aqueous coating composition as defined in claim 12 wherein said aqueous colloidal silica dispersion has a basic pH, an average particle size of about 12 millimicrons and an alkali content of about 0.10%.

14. An aqueous coating composition comprising a dispersion of colloidal silica having a particle size of from 5 to 15 millimicrons in diameter in a lower aliphatic alcohol-water solution of the partial condensate of a silanol of the formula $RSi(OH)_3$, wherein the lower-aliphatic alcohol-water solvent contains from about 20 to 75 weight percent of said lower-aliphatic alcohol component and wherein R is selected from the group consisting of alkyl having from 1 to 3 carbon atoms and aryl, at least 70 weight percent of the silanol being $CH_3Si(OH)_3$, said composition containing 10 to 50 weight percent solids consisting essentially of 10 to 70 weight percent colloidal silica and 30 to 90 weight percent of the partial condensate, the composition further containing from about 0.1 to about 1 percent by weight of a thickening agent selected from the group consisting of hydroxypropyl cellulose and hydroxypropyl guar gum.

15. An aqueous coating composition as defined in claim 14 wherein the lower-aliphatic alcohol is a mixture of methanol and isopropanol.

16. An aqueous coating composition as defined in claim 14 wherein said silanol is $CH_3Si(OH)_3$.

* * * * *